(12) United States Patent
Flood

(10) Patent No.: US 10,901,399 B2
(45) Date of Patent: Jan. 26, 2021

(54) HIGH AVAILABILITY INDUSTRIAL AUTOMATION CONTROLLER AND METHOD OF OPERATING THE SAME

(71) Applicant: Rockwell Automation Technologies, Inc., Mayfield Heights, OH (US)

(72) Inventor: Mark A. Flood, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 181 days.

(21) Appl. No.: 16/145,629

(22) Filed: Sep. 28, 2018

(65) Prior Publication Data

US 2020/0103860 A1 Apr. 2, 2020

(51) Int. Cl.
*G05B 23/02* (2006.01)
*G05B 19/418* (2006.01)

(52) U.S. Cl.
CPC ..... *G05B 19/4184* (2013.01); *G05B 23/0289* (2013.01); *G05B 23/0291* (2013.01); *G05B 23/0297* (2013.01)

(58) Field of Classification Search
CPC ............ G06F 11/2023; G06F 11/2028; G06F 11/2069; G06F 11/1076; G06F 11/1479; G06F 11/1497; G06F 11/1068
See application file for complete search history.

(56) References Cited

U.S. PATENT DOCUMENTS

| | | | | |
|---|---|---|---|---|
| 6,983,294 B2* | 1/2006 | Jones | .................. | G06F 11/1658 |
| 7,360,047 B2* | 4/2008 | Muto | .................. | G06F 11/2069 711/100 |
| 7,392,424 B2* | 6/2008 | Ho | .......................... | H04L 45/00 714/4.4 |
| 9,002,721 B2* | 4/2015 | Hughes | ............ | G06Q 10/06311 705/7.15 |
| 9,996,431 B2* | 6/2018 | Wang | .................. | G05B 19/0421 |
| 10,073,749 B2* | 9/2018 | Ferranti | ................ | G06F 11/203 |

(Continued)

OTHER PUBLICATIONS

Ma Yue et al.; "Design of Safety PLC Execution Unit Based on Redundancy Structure of Heterogeneous Dual-Processor"; 2017 10th International Conference on Intelligent Computation Technology and Automation (ICICTA); IEEE, Oct. 9, 2017 (Oct. 9, 2017), pp. 364-368—(6) pages.

(Continued)

*Primary Examiner* — Nadeem Iqbal
(74) *Attorney, Agent, or Firm* — Boyle Fredrickson, SC

(57) ABSTRACT

A high availability industrial automation controller used in a high availability industrial automation system is disclosed. The controller includes instructions executable by a processor to receive information about a lost redundancy in the industrial automation system, change a first redundancy state and a second redundancy state associated with a first task and a second task, respectively, upon receiving the information, perform the first task and the second task. The performing the first/second task can include identifying the first/second redundancy state has been changed, modifying operation of the first/second task in response to the first/second redundancy state being changed, and resetting the first/second redundancy state. Also disclosed is a method of operating the industrial automation controller.

20 Claims, 6 Drawing Sheets

(56) References Cited

U.S. PATENT DOCUMENTS

| | | | |
|---|---|---|---|
| 10,459,413 B2* | 10/2019 | Tegnell | G05B 19/0421 |
| 2003/0023892 A1 | 1/2003 | Giovanni | |
| 2005/0197718 A1* | 9/2005 | Shin | G06F 11/202 |
| | | | 700/1 |
| 2008/0126882 A1 | 5/2008 | Fulton et al. | |
| 2009/0125122 A1* | 5/2009 | Cook | G05B 19/058 |
| | | | 700/9 |
| 2013/0103977 A1* | 4/2013 | Zimmermann | G06F 11/0793 |
| | | | 714/4.11 |

OTHER PUBLICATIONS

Extended European Search Report dated Jan. 29, 2020; Application No. 19199160.3—(10) pages.

* cited by examiner

HIGH AVAILABILITY INDUSTRIAL AUTOMATION CONTROLLER AND METHOD OF OPERATING THE SAME

BACKGROUND INFORMATION

The subject matter disclosed herein relates to industrial automation systems. More specifically, the subject matter disclosed herein relates to high availability industrial automation systems having primary and secondary industrial automation controllers.

As is known to those skilled in the art, industrial controllers are specialized electronic computer systems used for the control of industrial processes or machinery. An example industrial controller is a programmable logic controller (PLC) used in a factory environment. Industrial controllers differ from conventional computers in a number of ways. Physically, they are constructed to be substantially more robust against shock and damage and to better resist external contaminants and extreme environmental conditions. The processors and operating systems of industrial controllers are optimized for real-time control and execute languages allowing ready customization of programs to comport with a variety of different controller applications. Industrial controllers may have a user interface for accessing, controlling, and/or monitoring the industrial controller. An example user interface can include a locally connected terminal having a keyboard, mouse, and display.

Industrial controllers can used in a high availability (HA) industrial system. High availability refers to a system or component that is continuously operational for a desirably long length of time. In many HA system applications, it is not enough for the system to maintain control after a single fault occurs. The user often needs to change the system operations when the HA state has changed. This may include doing a controlled shutdown or going to some other form of reduced functionality. The overhead to monitor the HA state during every phase of the user application is a burden on system performance. Further, requiring the code to monitor the HA state in every phase of the application code could easily lead to the monitoring being erroneously omitted during some phases.

BRIEF DESCRIPTION

Disclosed herein is an improved industrial automation controller for a high availability industrial system. The industrial automation controller includes a program that executes many tasks, such as event tasks, periodic tasks, and continuous tasks. In embodiments, each task includes one or more bits that are set at the start of a next program scan after a redundancy state change and remain set for one scan only. The inclusion of the bit(s) for redundancy state changes provide a means for the program to react to changes in the HA state, without the burden of constantly monitoring the state. In additional embodiments, the program can include event tasks that are only executed after the redundancy state has changed.

In one embodiment, the invention provides an HA industrial automation controller. The controller includes a non-transitory storage medium configured to store a plurality of instructions and store a plurality of tasks. The plurality of tasks includes a first task having a first redundancy state and a second task having a second redundancy state. The processor is in communication with the non-transitory storage medium. The processor is operative to execute the plurality of instructions to receive information related to a lost redundancy in an industrial automation system, change the first redundancy state upon receiving the information, change the second redundancy state upon receiving the information, perform the first task, and perform the second task. Performing the first task includes identifying the first redundancy state has changed and resetting the first redundancy state. Performing the first task can further include modifying the first task based on the first redundancy state being changed and/or executing a third, event task based on the first redundancy state being changed.

In another embodiment, the invention provides a method of operating an industrial automation controller. The method includes receiving information about a lost redundancy in an industrial automation system, changing a first redundancy state associated with a first task upon receiving the information, changing a second redundancy state associated with a second task upon receiving the information, and performing the first task. Performing the first task includes identifying the first redundancy state has changed and resetting the first redundancy state. Performing the first task can further include modifying the first task based on the first redundancy state being changed and/or executing a third, event task based on the first redundancy state being changed. The method can further include performing the second task including identifying the second redundancy state has changed and resetting the second redundancy state.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings, in which.

Figure 1:
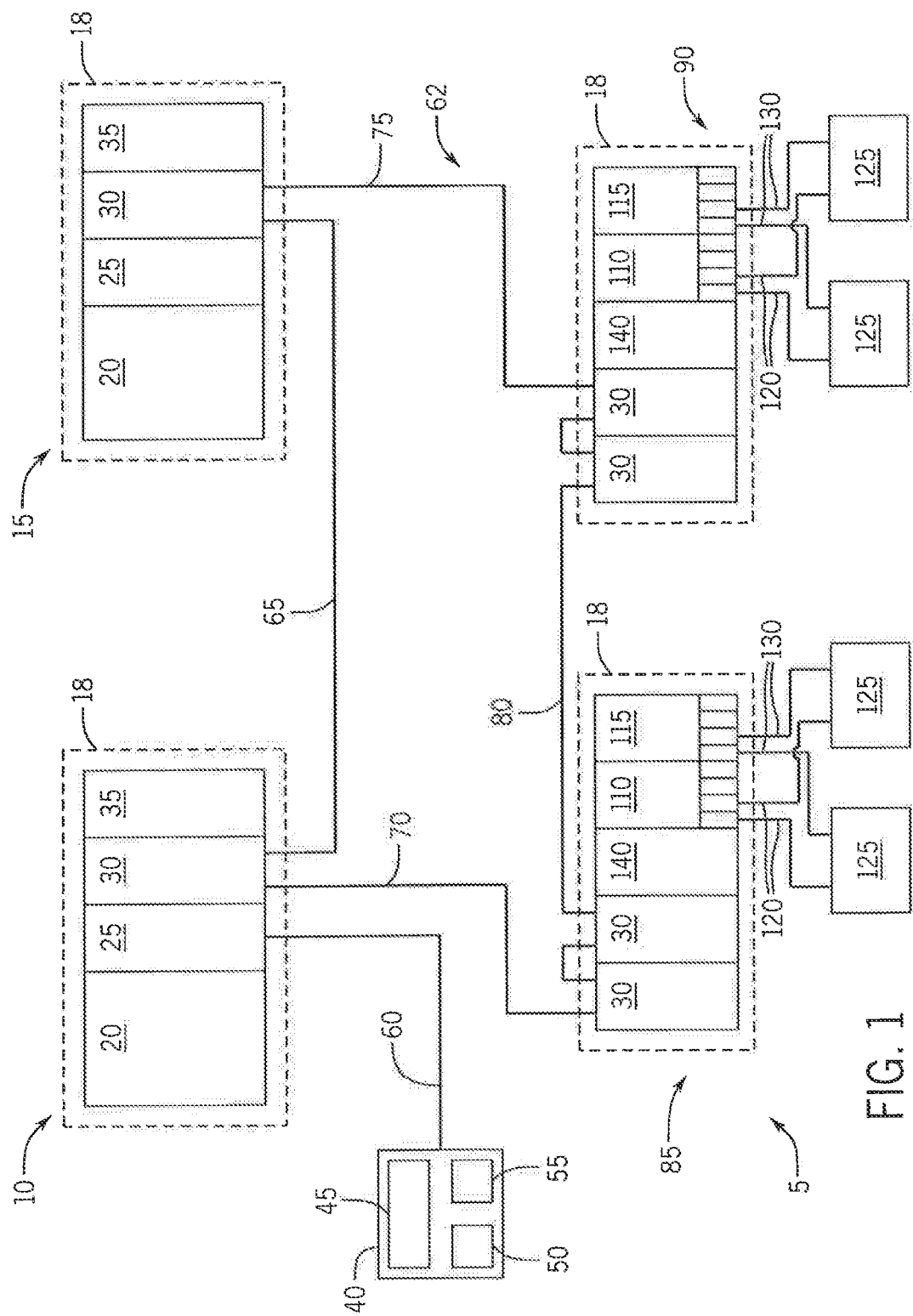
FIG. 1 is a block diagram representing a high availability industrial automation system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

With reference to FIG. 1, an industrial automation system 5 includes a first (or primary) industrial automation controller 10 and a second (or secondary) industrial automation controller 15. As illustrated, the first and second industrial automation controllers 10 and 15 are modular and may be made up of numerous different modules connected together on a rack or rail (represented by dashed line 18). Additional modules may be added or existing modules removed and the first and second industrial automation controllers 10 and 15 reconfigured to accommodate the new configuration. In the exemplary industrial automation system 5 shown, both the first and second industrial automation controllers 10 and 15 include a power supply module 20, a controller module 25, and a network module 30. Each industrial automation controller 10 and 15 is further shown with an additional module 35 that may be selected according to the controller requirements. An example additional module is an analog or digital input or output module, which will be referred to herein generally as an I/O module. Another example additional module is a redundancy module for maintaining redundant information between the first industrial automation controller 10 and the second industrial automation controller 15. In some embodiments, a dedicated high-speed connection (shown as dashed line 37) can couple a redundancy module of the first industrial automation controller 10 with the second industrial automation controller 15. An example of such an arrangement is disclosed in U.S. Pat. No. 5,777,874, the content of which is incorporated herein by reference. Other exemplary additional modules include an additional controller module or an additional network module.

An operator interface 40 is shown connected to the industrial automation system 5. The operator interface 40 can include a processing portion 45, an input device 50, and an output device 55. The input device 50 can include, but not limited to, a keyboard, touchpad, mouse, trackball, or touch screen. The output device 55 can include, but not limited to, a display, speaker, or printer. It is contemplated that each component of the operator interface 40 may be incorporated into a single unit, such as an industrial computer, laptop, or tablet computer. It is further contemplated that multiple operator interfaces can be distributed about the industrial automation system 5. The operator interface 40 may be used to display operating parameters and/or conditions of the controlled machine or process, receive commands from the operator, or change and/or load a control program or configuration parameters. An interface cable 60 connects the operator interface 40 to the first industrial automation controller I/O.

The first and second industrial automation controllers 10 and 15 are connected to other devices by a network 62 according to the application requirements. An interface cable 65 connects the network modules 30 of the controllers 10 and 15. An interface cable 70 connects the first industrial controller to a first remote rack 85. An interface cable 75 connects the second industrial controller to a second remote rack 90. An interface cable 80 connects the first remote rack 85 to the second remote rack 90. It is contemplated that the network cables 65-80 may be custom cables configured to communicate via a proprietary interface or may be a standard industrial cable for a non-proprietary network. Example non-proprietary networks include Ethernet/IP, DeviceNet, or ControlNet. The network cables 65-80 arrange the controllers and racks of the network 62 in what is referred to as a ring arrangement. It is contemplated that other network arrangements are possible for coupling the elements of the network 62, including arrangements that have switches that allow for redundancy communication paths, daisy-chain arrangements, star (simple or multi-layered) arrangements, or more complicated topologies such as redundant local area networks (LANs). The network modules 30 are configured to communicate according to the protocol of the network to which it is connected and may be further configured to translate messages between two different network protocols.

The first and second remote racks 85 and 90 are positioned at varying positions about the controlled automation system or process. As illustrated, each remote rack 65 and 90 is modular and may include numerous different modules connected together in a rack or mounted to a rail. Additional modules may be added or existing modules removed (e.g., one of the redundant network modules 30) and the remote rack 85 or 90 reconfigured to accommodate the new configuration.

As illustrated, each remote rack 85 and 90 includes a pair of network modules 30. Each network module 30 is connected to one of the network cables 70-80, an input module 110, and an output module 115. Each pair of network modules 30 allows for network redundancy at the respective remote rack 85 or 90. Each of the input modules 110 is configured to receive input signals 120 from controlled devices 125. Each of the output modules 115 is configured to provide output signals 130 to the controlled devices 125. The input and output modules 110 and 115 may alternatively be configured in singular modules, and collectively the modules may be referred to as I/O modules 110 and 115. Moreover, still other modules 140 may be included in the remote rack 85. It is understood that the industrial automation system 5, the industrial automation controllers 10 and 15, and the remote racks 85 and 90 may take numerous other forms and configurations without deviating from the scope of the invention.

Figure 2:
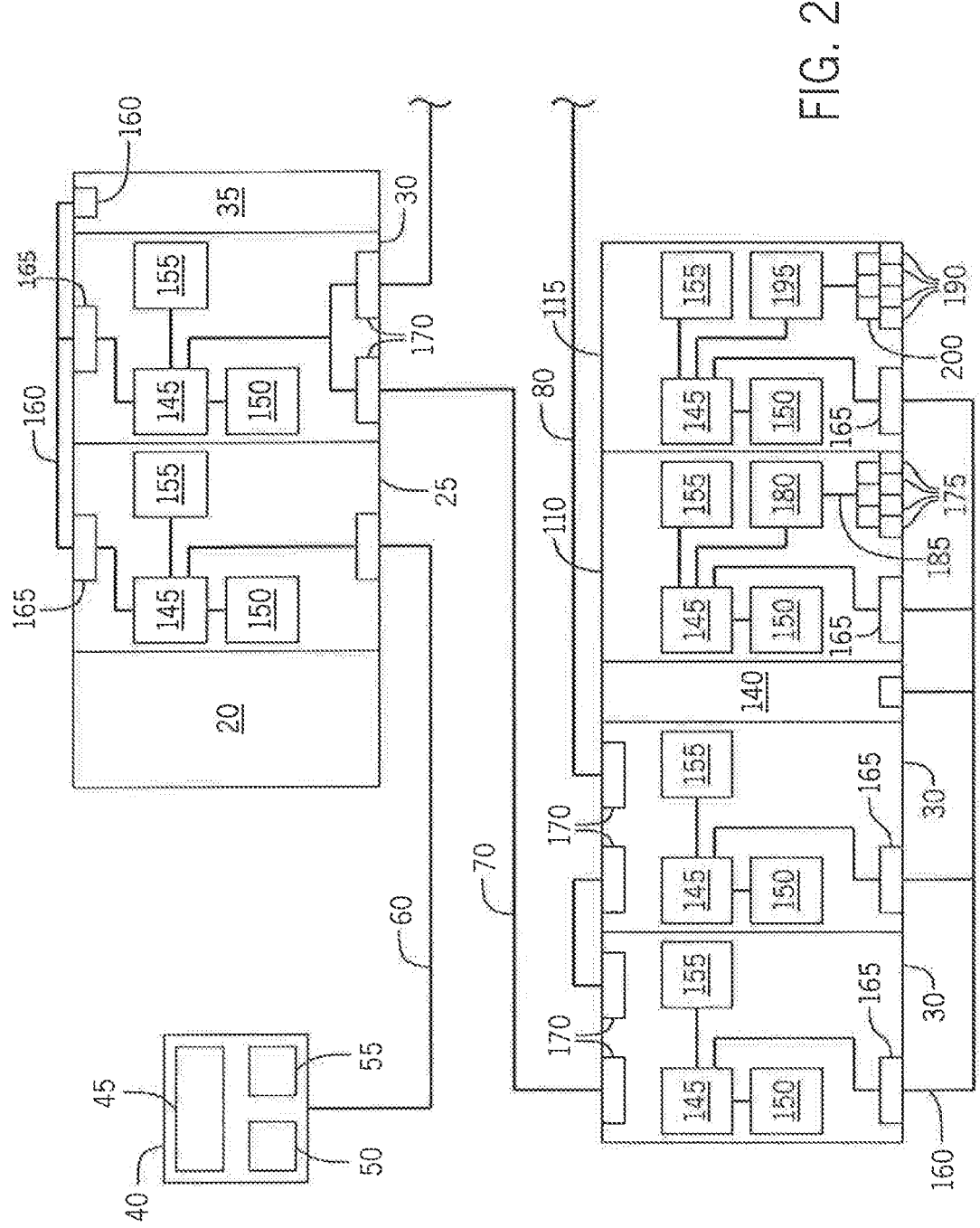
FIG. 2 is a block diagram representing some aspects of the exemplary industrial automation system of FIG. 1 in greater detail.

Referring next to FIG. 2, a portion of the exemplary industrial automation system of FIG. 1 is illustrated in block diagram form. It is contemplated that each of the nodes in the network may include a processor 145 and a memory 150. The processors 145 are configured to execute instructions and to access or store operating data and/or configuration parameters stored in the corresponding memory 150. The processors 145 are suitable processors according to the node requirements. It is contemplated that the processors 145 may include a single processing device or multiple processing devices executing in parallel and may be implemented in separate electronic devices or incorporated on a single electronic device, such as a field programmable gate array (FPGA) or application specific integrated circuit (ASIC). The memory devices 150 are non-transitory storage mediums that may be a single device, multiple devices, or may be incorporated in part or in whole within the FPGA or ASIC. Each of the nodes also includes a clock circuit 155, and each clock circuit 155 is preferably synchronized with the other clock circuits 155 according to, for example, the IEEE-1588 clock synchronization standard. Each clock circuit 155 generates a time signal configurable to report the present time accurate to either microseconds or nanoseconds. Communication between nodes mounted in the same rack or contained within a single housing occurs via a backplane 160 and a corresponding backplane connector 165. Nodes communicating via network media 65-80 include ports 170 configured to process the corresponding network protocol. The input module 110 includes input terminals 175 configured to receive the input signals 120 (FIG. 1) from the controlled devices 125, 135. The input module 110 also includes any associated logic circuitry 180 and internal connections 185 required to process and transfer the input signals 120 from the input terminals 175 to the processor 145. Similarly, each output module 115 includes output terminals 190 configured to transmit the output signals 130 (FIG. 1) to the controlled devices 125,135 (FIG. 1). The output module 115 also includes any associated logic circuitry 195 and internal connections 200 required to process and transfer the output signals 130 from the processor 145 to the output terminals 190.

Figure 3:
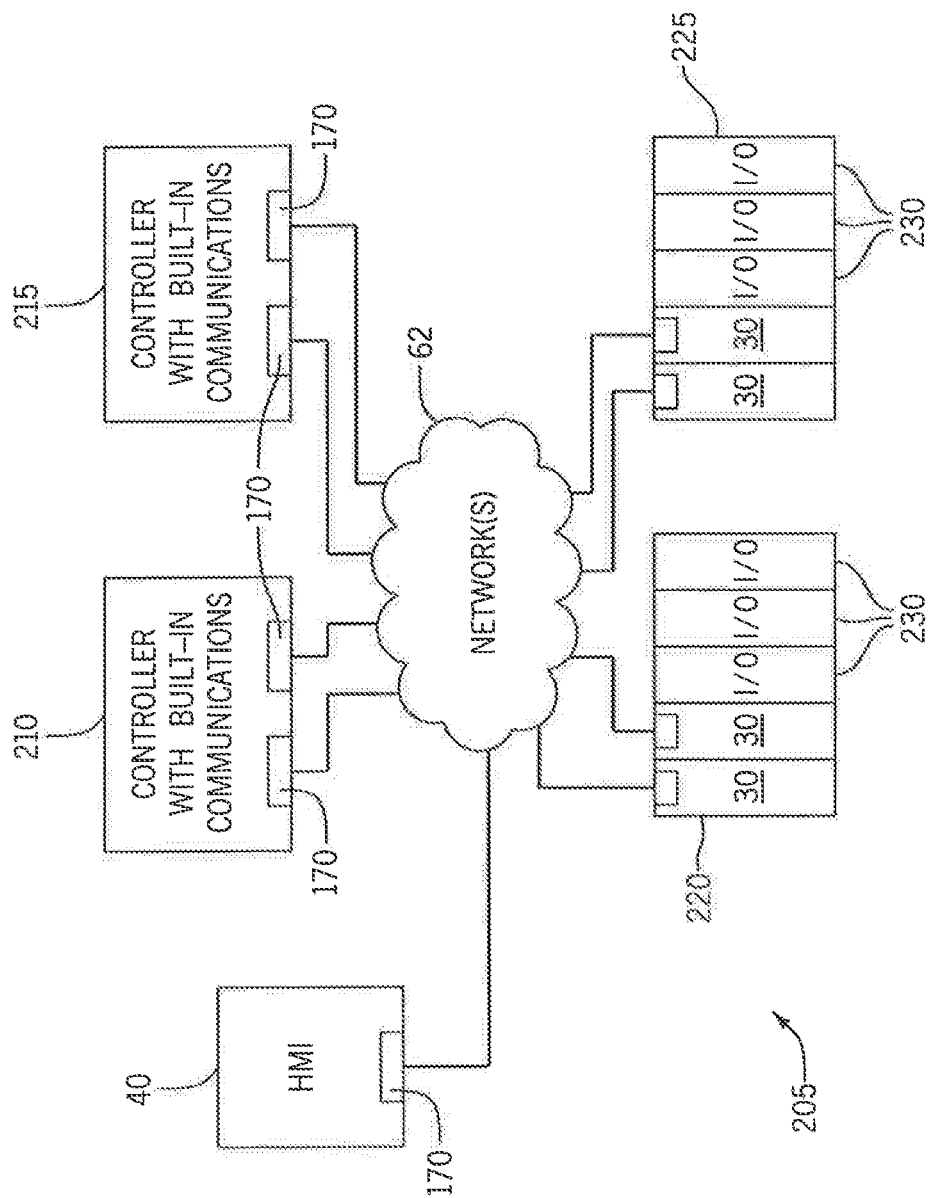
FIG. 3 is a block diagram representing a high availability industrial automation system according to another embodiment of the invention.

FIG. 3 shows another exemplary automation system 205 including a first (or primary) industrial automation controller 210 and a second (or secondary) industrial automation controller 215. The first and second industrial automation controllers 210 and 215 are not shown in FIG. 3 as being multi-modular (as compared to the controllers 10 and 15 of FIG. 1), but are unitary industrial automation controllers with power supplies and communications built within the controllers. Further, the first and second remote racks 220 and 225 are shown with the Input/Output (I/O) modules 230 as being unitary modules, unlike the distributed I/O modules 110 and 115 shown in FIG. 1.

While many exemplary industrial automation systems have been disclosed thus far, the description below will be discussed in connection with FIGS. 1 and 2. One skilled in the art will understand that the description can be used in the other exemplary industrial automation systems discussed above and other systems known in the art.

During operation, many industrial automation controllers use routine and non-routine tasks. Handling the tasks appropriately within an industrial automation controller means the difference between smooth, error-free production and unnecessary downtime and waste. For example, a shipping company moves thousands of packages along a maze of conveyors toward their destination. Executing a task at the wrong time instantly sends a package down a wrong path and delays the delivery of the package.

A task defines how and when the industrial automation controller 10 or 15 executes various sections of application code. Tasks can be prioritized so that the operator can tune the industrial automation system's 5 execution to the desired operation. Example task types include, but not limited to, continuous tasks, periodic tasks, and event tasks.

A continuous task is how a programmable controller traditionally operates; the controller scans the code from top to bottom. When the code completes, it goes back to the top and restarts the code. The continuous task typically operates as a background task at the lowest priority. The continuous task uses any processor time that remains after the industrial automation controller 10 or 15 executes the other tasks.

A periodic task executes all of its code from top to bottom. However, when a periodic task completes its scan, it waits a preconfigured time interval before restarting. The industrial automation controller 10 or 15 can have multiple periodic tasks that can be triggered at the same or at different preconfigured time intervals. The industrial automation controller 10 or 15 controller needs to determine which tasks it can or cannot interrupt. This is accomplished by way of a priority setting for each periodic task. Tasks with higher priority cause lower priority tasks (and the continuous task) to be suspended so that the higher priority tasks can take control and perform their operation. Tasks with lower priority wait for higher priority tasks to complete before being given an opportunity to execute. Tasks configured at the same priority level can automatically, for example, be time-sliced back and forth on a periodic basis until one of the tasks completes. Because the scan time required to execute a continuous task can be quite lengthy, periodic tasks let the industrial automation controller 10 or 15 to move a small amount of code into a separate execution thread and trigger its execution at a higher rate.

An event task has the industrial automation controller 10 or 15 execute a piece of code based on the detection of some incident that occurs in the industrial control system 5. Example types of incidents (triggers) that can initiate the event task include: traditional input point trigger, receipt of produced/consumed tags, certain motion operations, and instruction in another task on the controller 10 or 15.

Similar to periodic tasks, the industrial automation controller 10 or 15 assigns a priority to each event task. This lets the event task either immediately take control at a high priority or wait at a low priority for other tasks to complete. Because event tasks only execute when their trigger is initiated, they reduce the amount of code the industrial automation controller 10 or 15 must scan on a regular basis. This frees up additional controller bandwidth to perform other operations or improve the overall performance of the application. The additional performance coupled with ability of an event task to respond to high speed inputs gives the industrial control system 10 or 15 extra capacity to increase production output.

Figure 4:
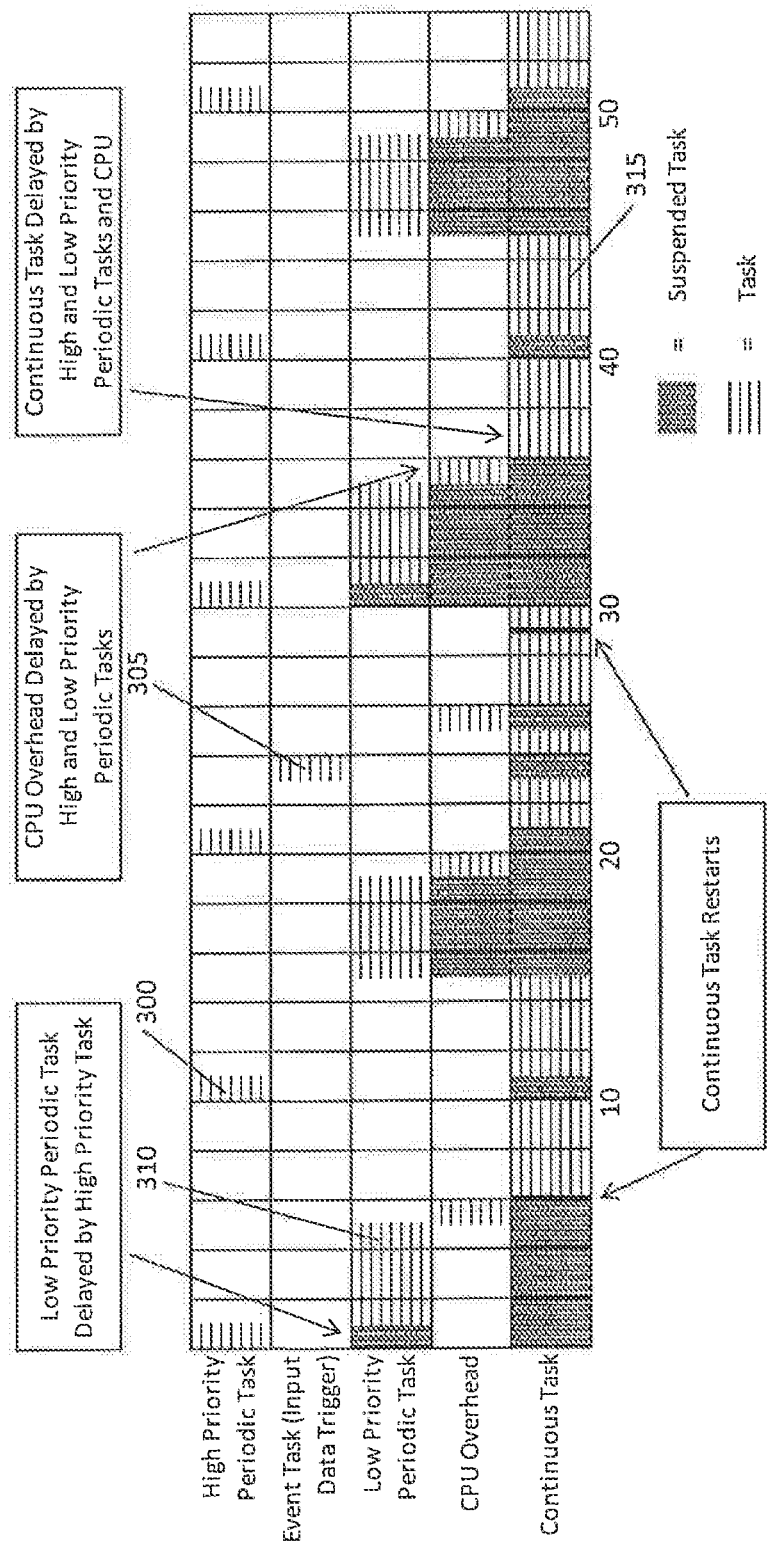
FIG. 4 is a diagram representing a program having continuous, periodic, and event tasks.

FIG. 4 represents a simple program with event tasks, periodic tasks, and continuous tasks. Table 1 (below) provides a key for the diagram representation of FIG. 4. The high priority periodic task 300 is a periodic task that interrupts all task, regardless of priority. If the high priority periodic task 300 is executing when another task is triggered, the other task waits until the high priority periodic task 300 is done. The event task 305 occurs in response to a sensed input. The low priority periodic task 310 occurs at periodic intervals. For the example shown, the periodic interval is 14 ms. The continuous task 315 operates in the background when processing time is available. While FIG. 4 represents a simple program, one skilled in the art will appreciate that the program can be very complex with hundreds of tasks. Moreover, the industrial automation system 5 may include multiple industrial application controllers running concurrently, each with their own program and tasks.

TABLE 1

| Task | Configuration | Execution Time | Duration |
|---|---|---|---|
| High Priority Periodic Task | Trigger = 10 ms period; Priority = 1 | 1 ms | 1 ms |

TABLE 1-continued

| Task | Configuration | Execution Time | Duration |
|---|---|---|---|
| Event | Trigger = Input Priority = 2 | 1 ms | 1 to 2 ms |
| Low Priority Periodic Task | Trigger = 15 ms period; Priority = 3 | 4 ms | 4 to 6 ms |
| CPU Overhead | 20% of continuous task (i.e., 1 ms out of every 5 ms) | assumes 1 ms worst case | 1 to 7 ms |
| Continuous | Not Applicable (N/A) | 14 ms | ≈20 to 30 ms |

Figure 5:
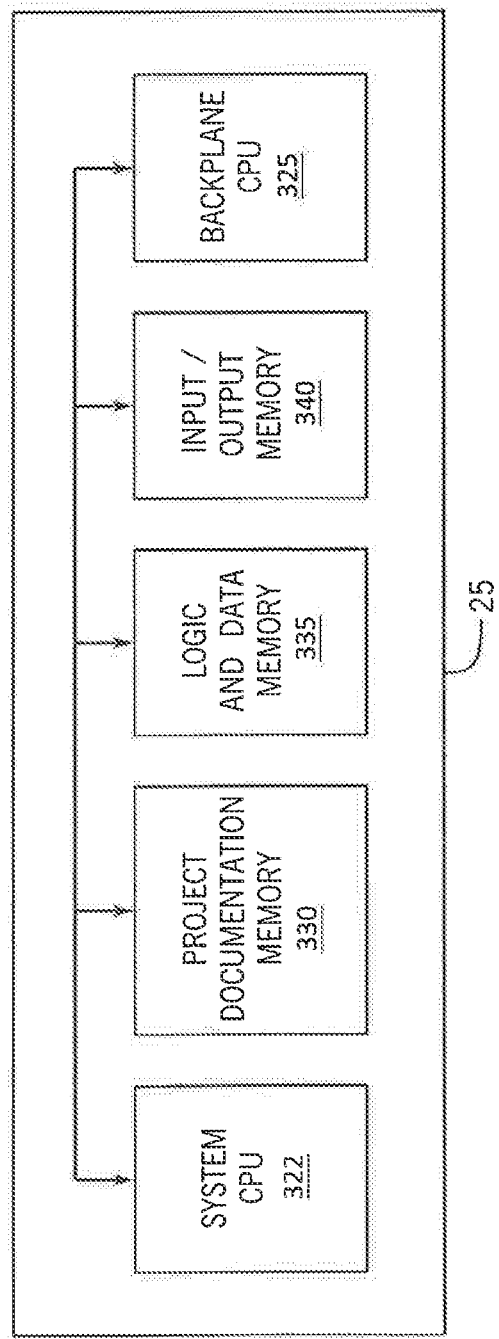
FIG. 5 is a block diagram representing a processor and memory arrangement for one embodiment of a system controller of an industrial automation controller.

FIG. 5 is a block diagram showing one example arrangement for the processor 145 and memory 150 of a system controller 25. In FIG. 5, the processor 145 includes multiple computer processing units. The first computer processing unit (CPU) 322 is a system. CPU that executes application code and messages for communication with other components of the industrial automation system 5. The second CPU 315 is a backplane CPU that transfers I/O data and other module data on a backplane. The two CPUs 315 and 322 operate independently from each other. The memory is shown as having multiple memories. The memories include a project documentation memory 330, logic and data memory 335, and I/O memory 340. The project documentation memory 330 can include memory for comment descriptions, alarm logs, and data properties. The logic and data memory 335 includes memory for program source code, and program data. The memory 340 can include I/O data, message buffers, and similar data. The three memories 330-340 can similarly operate independently of each other, i.e., the processors can access information from distinct memories at the same time. While one arrangement for a processor 145 and memory 150 is shown in FIG. 4, it is contemplated that other arrangements and number of processors and/or memory can be different.

Included with the program source code and program data is a schedule defining the various tasks to be executed as part of the program. The schedule can take many forms, but generally includes key information from Table 1. For example, the schedule can include a task name, a task type, and a task configuration. Other information can be included in the schedule and can be utilized by the program. An example of additional information for each task is a redundancy state, which will be discussed in more detail below.

state during every phase of the application is a significant burden on the system and its operation.

An alternative to the above would be to include a redundancy state for each task of an industrial automation controller 10 and 15. Further, one or more event tasks can be triggered by the industrial automation controller 10 or 15 based on the changed redundancy state. The result is that the industrial automation controller 10 or 15 can react to changes in the HA state, without the burden of also constantly monitoring for the HA state.

Table 2, below, provides an improved key from Table 1. Included in Table 2, which is the basis for an improved schedule, is that the tasks include additional status bit(s) defining a redundancy state. These hits can be available for each task. The redundancy state can be set at the start of the next program scan after a redundancy state change; e.g., a switchover from the primary industrial controller 10 to the secondary industrial controller 15. In some operations, the redundancy state for each task is reset at the end of the respective task. Accordingly, each task is informed of the redundancy state change once, and only once upon completion of the task.

The schedule can also include one or more event tasks that are scheduled based on the redundancy state changing. These event tasks can be called within the main program or can be called by one of the other tasks. Included with the program source code and program data is the improved schedule defining the various tasks to be executed as part of the program. However, unlike table 1, the schedule of table 2 can include a task name, a task type, a task configuration, a redundancy state, and specific event tasks based on the redundancy state.

TABLE 2

| Task | Configuration | Execution Time | Duration | Redundancy State |
|---|---|---|---|---|
| High Priority Periodic Task | Trigger = 10 ms period; Priority = 2 | 1 ms | 1 ms | 00 |
| Event | Trigger = Redundancy State being non 00; Priority = 1 | 1 ms | 1 to 2 ms | 00 |
| Event | Trigger = Input; Priority = 3 | 1 ms | 1 to 3 ms | 00 |
| Low Priority Periodic Task | Trigger = 15 ms period; Priority = 4 | 4 ms | 4 to 7 ms | 00 |
| CPU Overhead | 20% of continuous task (i.e., 1 ms out of every 5 ms) | assumes 1 ms worst case | 1 to 9 ms | N/A |
| Continuous | N/A | 14 ms | ≈20 to 35 ms | 00 |

Figure 6:
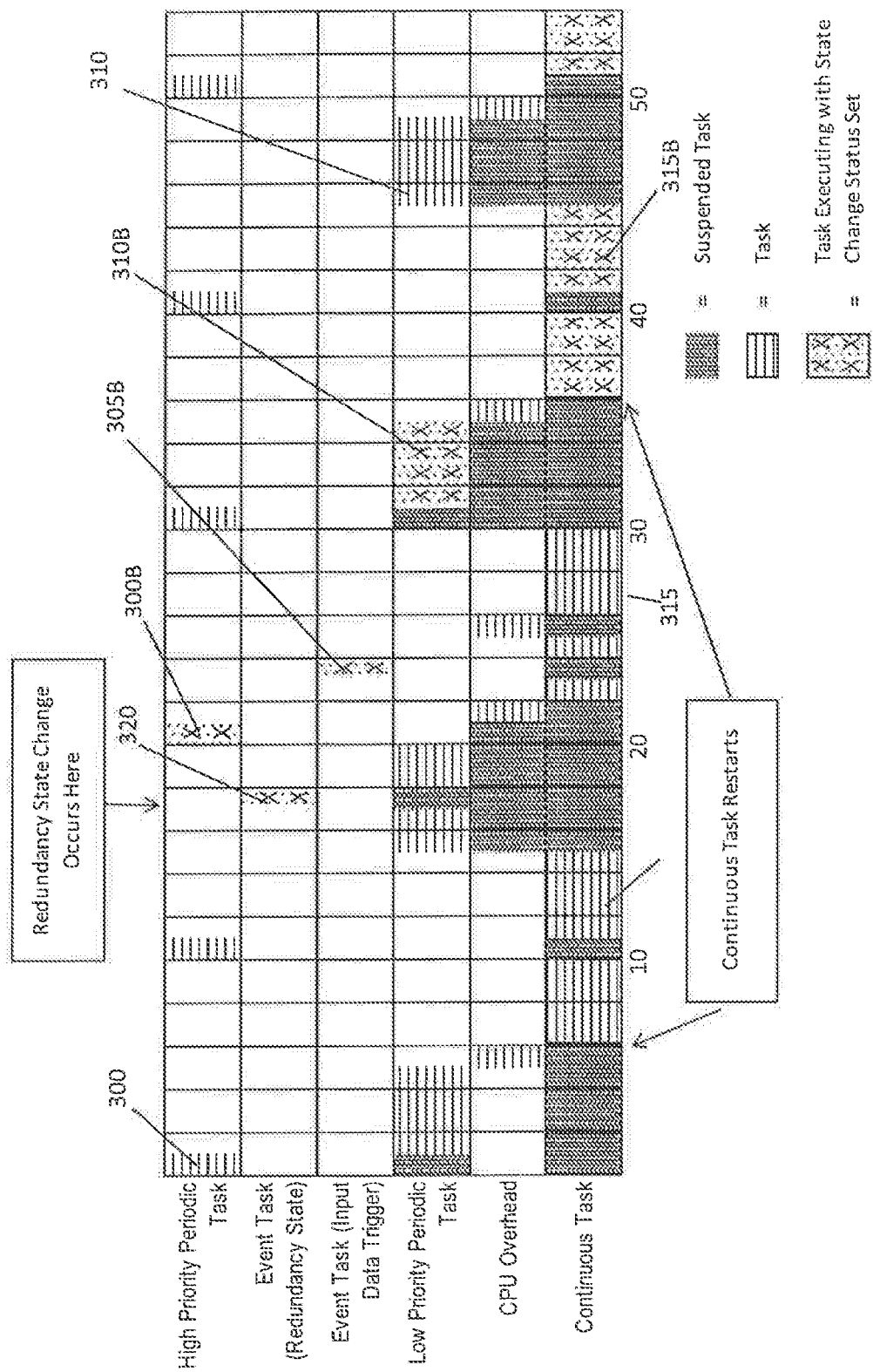
FIG. 6 is a diagram representing another program having continuous, periodic, and event tasks.

In many HA industrial automation applications, the user often needs to change the system operations when the HA state has changed. This may include a controlled shutdown, going to some other form of reduced functionality, or to a modified operation. Historically, it was known for the operator to monitor for the HA state or require program code to monitor for the HA state. The overhead to monitor the HA FIG. 6 represents an improved program with event tasks, periodic tasks, and continuous tasks. Table 2 (above) provides the key for the diagram representation of FIG. 6. In FIG. 6, a redundancy state change occurs at 17 ms. For the program, an event task 320 is executed after the change of redundancy state. An exemplary event task 320 can include modifying all of the redundancy states in Table 2 based on the redundancy state change. The next time each task 300, 305, 310, and 315 executes, the industrial automation controller 10 or 15 identifies that the redundancy state has changed, e.g., is no longer 00, and modifies its operation as a result. This is identified in FIG. 6 as 300B, 305B, 310B, and 315B. During each task's execution, the industrial automation controller 10 or 15 resets the redundancy state for the respective task, e.g., back to 00. Typically, the redundancy state is reset at the end of the respective task.

The industrial automation controller 10 or 15 has several options on what bits could be provided for the redundancy state. For example, a single bit can be used to identify whether the redundancy state has changed. As another example, multiple bits (i.e., 2 or more) can be used to help identify more than two states. For example multiple bits can be used to identify switchover from primary to secondary industrial controllers, a qualified secondary industrial controller being lost, and a secondary qualification being achieved. Similarly, more bits can be used to identify even more redundancy states, such as: switchover, first scan primary with no partner, first scan primary with disqualified secondary, first scan primary with qualified secondary, qualified secondary lost, secondary qualification achieved, standby mode, etc. By providing the redundancy state bits, the industrial automation controller 10 or 15 does not have to continuously acknowledge the state change. Rather, the state is set for one scan, the controller reacts to the state being set, and the state is automatically cleared or reset at the end of the scan.

Similarly, the industrial automation controller 10 or 15 has several options for event tasks that can be triggered. Example triggers that could be provided include execute on new primary at switchover, execute on primary after any redundancy state change, execute for selected redundancy state changes, execute on loss of qualified secondary, execute for secondary qualification achieved, etc. The event tasks can be one of many tasks including notifying the operator or a device if the redundancy state has changed, changing functionality of the industrial automation controller 10 or 15, etc.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A method of operating an industrial automation controller, the method comprising:
    receiving information about a lost redundancy in an industrial automation system;
    changing a first redundancy state associated with a first task upon receiving the information, the first task executing on the industrial automation controller;
    changing a second redundancy state associated with a second task upon receiving the information, the second task executing on the industrial automation controller;
    performing the first task on the industrial automation controller, the first task including:
        identifying the first redundancy state has changed, and
        resetting the first redundancy state;
    performing the second task on the industrial automation controller, the second task including:
        identifying the second redundancy state has changed, and
        resetting the second redundancy state.

2. The method of claim 1, wherein the information about the lost redundancy is selected from the group consisting of a switchover from a primary industrial controller to a secondary industrial controller, a qualified secondary industrial controller being lost, a scan of a primary industrial controller with no secondary industrial controller, and a scan of a primary industrial controller with a disqualified secondary industrial controller.

3. The method of claim 1, further comprising:
    receiving second information about a returned redundancy in the industrial automation system;
    changing the first redundancy state associated with the first task upon receiving the second information;
    changing the second redundancy state associated with the second task upon receiving the second information;
    performing the first task again including
    identifying the first redundancy state has changed, and
    resetting the first redundancy state;
    performing the second task again including
    identifying the second redundancy state has changed, and
    resetting the second redundancy state.

4. The method of claim 3, wherein the second information about a returned redundancy includes identifying a qualified secondary industrial automation controller being connected to the industrial automation controller.

5. The method of claim 1, wherein the resetting the first redundancy state occurs upon completion of the first task and the resetting the second redundancy state occurs upon completion of the second task.

6. The method of claim 1, wherein performing the first task includes modifying the first task based on the first redundancy state being changed.

7. The method of claim 1, wherein performing the first task includes performing a third task based on the first redundancy state being changed, the third task being an event task that is only executed based on the first redundancy state being changed.

8. The method of claim 1, wherein the first redundancy state is a redundancy bit.

9. The method of claim 1, wherein the first redundancy state includes a plurality of redundancy bits.

10. The method of claim 1, wherein the industrial automation controller includes a plurality of tasks including the first task and the second task.

11. A high availability industrial automation controller, the controller comprising:
    a non-transitory storage medium configured to store a plurality of instructions and to store a plurality of tasks, the plurality of tasks includes a first task having a first redundancy state and a second task having a second redundancy state; and
    a processor in communication with the non-transitory storage medium and operative to execute the plurality of instructions to:
        receive information related to a lost redundancy in an industrial automation system,
        change the first redundancy state upon receiving the information,
        change the second redundancy state upon receiving the information, perform the first task including:
identifying the first redundancy state being changed, and
resetting the first redundancy state, and
perform the second task including:
identifying the second redundancy state being changed, and
resetting the second redundancy state.

12. The controller of claim 11, wherein the information about the lost redundancy is selected from the group consisting of a switchover from a primary industrial controller to a secondary industrial controller, a qualified secondary industrial controller being lost, a scan of a primary industrial controller with no secondary industrial controller, and a scan of a primary industrial controller with a disqualified secondary industrial controller.

13. The controller of claim 11, wherein the processor is further operative to execute the plurality of instructions to:
receive second information about a returned redundancy in the industrial automation system,
change the first redundancy state associated with the first task upon receiving the second information,
change the second redundancy state associated with the second task upon receiving the second information,
perform the first task again including
identify the first redundancy state being changed, and
reset the first redundancy state,
perform the second task again including
identify the second redundancy state being changed, and
reset the second redundancy state.

14. The controller of claim 13, wherein the second information about a returned redundancy includes identifying a qualified secondary industrial automation controller being connected to the industrial automation controller.

15. The controller of claim 11, wherein the resetting the first redundancy state occurs upon completion of the first task and the resetting the second redundancy state occurs upon completion of the second task.

16. The controller of claim 11, wherein performing the first task includes the process being further operative to execute the plurality of instructions to modify the first task based on the first redundancy state being changed.

17. The controller of claim 11, wherein performing the first task includes the process being further operative to execute the plurality of instructions to perform a third task based on the first redundancy state being changed, the third task being an event task that is only executed based on the first redundancy state being changed.

18. The controller of claim 11, wherein the first redundancy state is a redundancy bit.

19. The controller of claim 11, wherein the first redundancy state includes a plurality of redundancy bits.

20. The controller of claim 11, wherein the first task is selected from the group consisting of a continuous task, a periodic task, and an event task.

* * * * *